United States Patent [19]
Jankus

[11] Patent Number: 5,235,152
[45] Date of Patent: Aug. 10, 1993

[54] DEVICE FOR FLOODING A WELD SEAM BETWEEN TWO PIPES TO BE WELDED WITH GAS

[76] Inventor: Werner Jankus, Unterer Weg 6, 4600 Dortmund 30, Fed. Rep. of Germany

[21] Appl. No.: 899,788

[22] Filed: Jun. 17, 1992

[30] Foreign Application Priority Data

Jun. 18, 1991 [DE] Fed. Rep. of Germany ....... 9107465

[51] Int. Cl.$^5$ ................................................. B23K 9/16
[52] U.S. Cl. .................... 219/74; 219/60 R; 219/136
[58] Field of Search ................... 219/74, 60 R, 61, 136

[56] References Cited
U.S. PATENT DOCUMENTS
5,126,526 6/1992 Schnorrer ............................ 219/74

FOREIGN PATENT DOCUMENTS
3300382C2 5/1985 Fed. Rep. of Germany .
60-221174 11/1985 Japan ....................................... 219/74
61-162271 7/1986 Japan ....................................... 219/74

Primary Examiner—Clifford C. Shaw
Attorney, Agent, or Firm—Herbert Dubno

[57] ABSTRACT

A device for flooding a weld junction between two devices with a protective gas has a double wall body received in the pipes and bridging the junction with sealing rings received in end chambers of the body braced against inner surfaces of the pipe. An intermediate chamber is bounded outwardly by a cylindrical shell of fine-pore sintered metal and has an inner wall provided with at least one fitting for connecting a supply pipe for the protective gas thereto. Between the intermediate chamber and at least one of the end chambers, at least one outlet chamber is formed to discharge excess protective gas through a throttle on an inner wall of the outlet chamber.

7 Claims, 2 Drawing Sheets

DEVICE FOR FLOODING A WELD SEAM BETWEEN TWO PIPES TO BE WELDED WITH GAS

FIELD OF THE INVENTION

My present invention relates to a device or apparatus for flooding a joint between two pipes which are to be welded with a weld seam at the joint, with a welding gas. More particularly, the invention relates to a device of this type which is provided with a fitting to which a gas source can be connected and which can dispense a gas through a fine-pore discharge surface into a region which is sealed at opposite axial sides.

BACKGROUND OF THE INVENTION

In the formation of high quality pipe welds for both low-alloy and high-alloy steel pipes, for example stainless steel pipes, it is an common practice to bring the pipe ends together at the junction at which the weld seam is to be formed and to supply a welding or protective gas to this site to limit the oxidation and scaling of the weld bead and the adjoining zones of the pipe.

This device can operate from within the pipe and can comprise, according to German patent document DE 33 00 382, for example, a pair of support disks of a heat-resistant elastomer which are disposed on opposite sides of the zone into which the gas is to be released within the pipes assembled for welding. Each of these support disks can be provided at its periphery with a pair of sealing lips which can be ben tin opposite directions from the disk plane. The support disks are mounted at opposite ends of a tube which, between the support disks comprises a body composed of a fine-porous material. A protective gas is fed through this tube and is discharged through this body into the zone flanked by the support disks, and thus enters the junction region of the two pipes in a substantially turbulence-free manner to provide the protective effect without detriment to the welding action.

The device has been found to be successful in use, but its configuration and construction leaves much to be desired when attempts are made to use the device for large-diameter pipes. For example, the stability of the support disks is limited and the device has been found to be less successful for nominal pipe sizes in excess of NW40, utilizing the European pipe standard.

OBJECTS OF THE INVENTION

It is, therefore, the principal object of the present invention to provide a device or apparatus for flooding a junction between two pipes to be welded with a protective gas which retains advantages of the earlier device as described but which is free from the drawbacks thereof.

Another object of this invention is to provide a device or apparatus for feeding a protective gas in a low-turbulence manner to a limited zone within a pair of pipes positioned to be welded together whereby the device has increased stability even for large-diameter pipes.

Still another object of my invention is to provide an improved device for the purposes described which can be used particularly effectively even with pipes having a nominal diameter or size in excess of NW40.

SUMMARY OF THE INVENTION

These objects and others which will become apparent hereinafter are attained, in accordance wit the invention with an apparatus or device adapted to be fitted within a pair of pipes to be welded together along the weld seam at a junction between the pipes and which comprises a double-wall cylinder having radial partitions subdividing its peripheral space into an axial succession of circumferentially extending chambers of which two axially-separated end chambers are downwardly open and can accommodate respective support or sealing rings whose lips are braced against the inner walls of the respective pipes to delimit opposite axial ends of the zone to be flooded with the gas. An intermediate chamber, also extending circumferentially and delimited by the radial partitions, is provided along its inner side wit a gas-supply fitting connectable to a source of the protective gas while its outer side is closed by a shell of fine porous material permeable to the gas so that the gas can be supplied to the zone through the pores of this shell.

The double-wall cylinder forms at least a first further circumferentially-extending chamber having a throttle for controlled escape of the gas form this zone.

Because of the construction of the body as a double-wall cylinder, it is possible to provide the double-wall cylinder of relatively large diameter and to utilize the device in pipes of relatively large nominal diameter, significantly greater than the diameters for which smaller devices have been used heretofore. Specifically, the radial distance between the inner wall of the pipe and the double-wall cylinder can be small so that the support rings can readily bridge this distance without loss of stability.

Since the zone to be flooded is limited to the annular space between the double wall cylinder and the inner surfaces of the pipes, gas consumption is reduced. The annular space is supplied with the protective gas uniformly form the shell of fine porous material and excess protective gas can escape through the throttle especially when the weld seam closes the gap between the pipe ends to be welded together.

The end chambers of the double wall cylinder can be provided of a form-fitting configuration complementary to the inner peripheries of the support and sealing rings and can overhand the inner peripheries of these sealing rings without the need for additional adjustment elements for fixing the sealing rings to the hollow body. For this purpose, the end chambers can open outwardly in relatively narrow slits so that inner peripheries of the sealing rings are trapped in these chambers.

The intermediate chamber between the end chambers is preferably open over its entire axial width outwardly and can receive the shell of a sintered metal fleece or mat which can be accommodated in the oppositely-facing flanks or walls defining the intermediate chamber and, more particularly, in the axially opening grooves formed in these radial partition walls.

Between the intermediate chamber and the end chambers, gas discharge chambers can be provided, these chambers having outer walls which can be provided with spaced-apart bores affording communication between these zones and these gas discharge chambers. In the inner wall of each of these gas discharge chambers, a respective throttle body can be provided. The throttle body can be a porous body of sintered metal.

Although the preferred embodiment of the invention has a gas discharge chamber to each axial side of the intermediate gas-supply chamber, only one such discharge chamber is necessary.

For very large-diameter systems using the invention, the double wall cylinder can be assembled from a plurality of cylindrical ring segments with respective gas feed fittings and support ring segments. In this case appropriate devices or elements can be provided to connect the neighboring cylinder ring segments or parts together.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
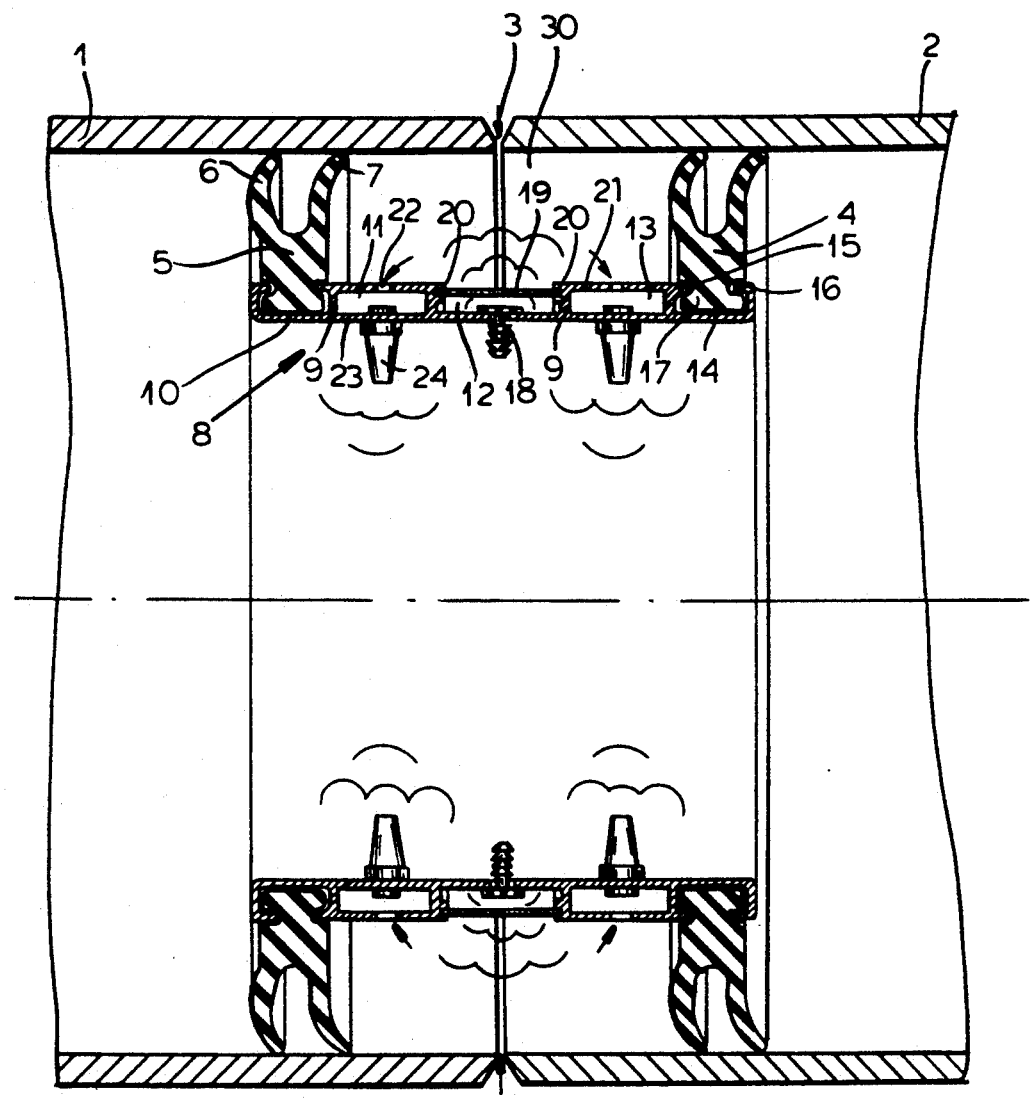
FIG. 1 is a schematic longitudinal section of a device according to the invention.

In FIG. 1, I have shown the two ends 1 and 2 of a pair of pipes to be welded together at a weld seam at the beveled butt ends of the pipe. The weld seam junction is represented at 3 in FIG. 1.

To flood the junction with a protective gas, a device or apparatus is inserted into the pipes which comprises a pair of support or sealing rings 4 and 5 of a heat-resistant elastomer which brace against the inner surfaces of the pipes 1 and 2 and, for that purpose, have circumferential sealing lips 6 and 7 which deflect against the pipes.

The sealing rings 4 and 5 are carried by a double wall cylinder 8 which has a plurality of axially-spaced radially-extending partitions 9 subdividing the interior of the peripheral wall of the cylinder 8 into a plurality of circumferentially-extending chambers 10, 11, 12, 13 and 14.

The two axially terminal chamber 10 and 14 receive the rings 4 and 5 and for that purpose have slit outer walls 15 which overhand the feet 17 formed along the inner periphery of the rings 4 and 5, the edges of the slit or groove 16 engaging in axially open grooves above the feet 17 of the rings 4 and 5, respectively.

The cross section of the feet 17 of the rings 4 and 5 are complementary to the cross section of the chambers 10 and 14 in which they are form-fittingly received.

The central or intermediate chamber 12 is provided along its inner wall with at least one gas supply fitting of which two are shown at 18 and are adapted to be connected to a pipe supplying the protective gas.

Externally the central chamber 12 is closed by a shell 19 of a sintered metal fleece which can be applied to a support fabric or web, also of metal. The edges of the cylindrical shell 19 are engaged in grooves 20 of the radial partitions 9 delimiting the central chamber 12.

Flanking the central chamber 12 are discharge chambers 11 and 13 which are gas-permeable and can have a multiplicity of openings or bores 22 circumferentially spaced around the outer walls 1 of the shells for collecting the excess protective gas.

Along their inner walls, each of these chambers 12, 13 can be provided with a throttle body 24 of fine-pore sintered metal.

The apparatus described, operates as follows:

Via a traction means not shown, for example, a cable, or in some other manner, the device of the invention is moved into the pipes 1, 2 until it straddles the junction 3, i.e. is in the position shown in FIG. 1 in which the sealing rings 4 and 5 engage the inner walls of the pipes 1 and 2 on opposite sides of the junction 3 and are equispaced therefrom.

The gas feed fittings 18 are connected to pipes supplying the protective gas. As long as the device is moved, the lips 6 and 7 deform and provide the seal and bracing which defines the zone or chamber 30 to be flooded with the gas. Before the welding process is commenced, the protective gas is supplied and the protective gas emerges form the chamber 12 through the shell 19 into zone 30 between the double wall cylinder 6 and the inner surfaces of the pipes 1 and 2. Air is driven out of this zone through the gap prior to the formation of the weld and the annular space is thereby filled with the protective gas.

The protective gas feed is maintained during the welding process and after closure of the weld seam, flushing with the protective gas continues to be possible because the excess of the protective gas discharges through the bores 22 and the throttles 24.

Figure 2:
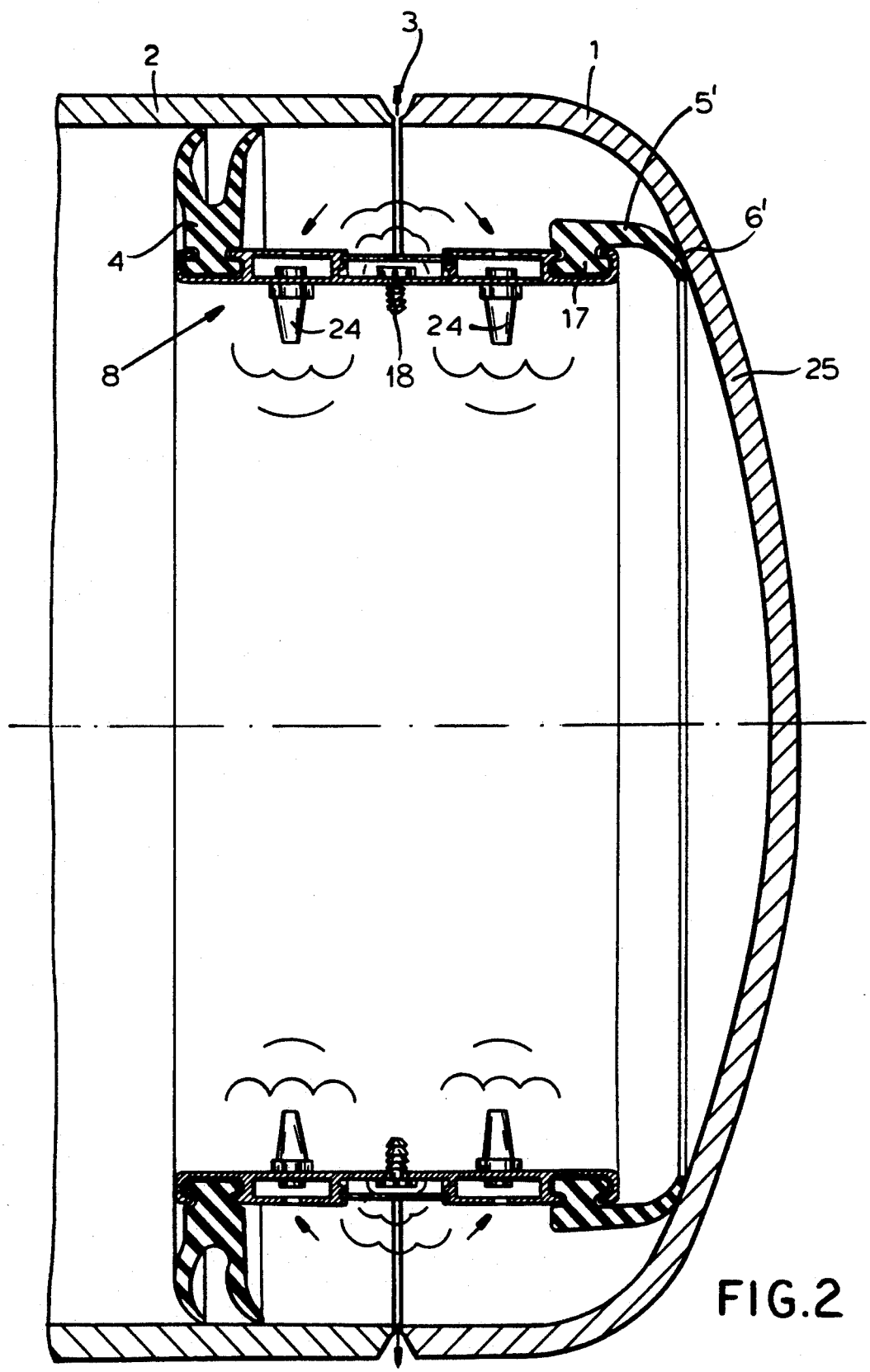
FIG. 2 is a similar cross section of another device utilizing the principles of the invention.

In the embodiment of FIG. 2, the same reference numerals are used to represent equivalent parts. Here, however, the weld seam 3 is provided between the end 1 of a dome or bell 25 and the end 2 of a pipe length. The sealing ring 5' here has a foot 17 formed laterally thereon and a single lip 6' which extends substantially parallel to the double wall cylinder 8 to engage against the bell or dome 25.

Although not illustrated, the double wall cylinder can be composed of a plurality of cylindrical ring segments with respective gas feed fittings and support ring segments.

I claim:

1. A device for flooding a junction zone between two pipes to be welded together at a junction with a protective gas, said device comprising:
    a double wall cylinder received in said pipes and formed within a double wall of the cylinder with a plurality of radial partitions subdividing said double wall of said cylinder peripherally and internally into a plurality of circumferentially continuous axially extending chambers including two end chambers, an intermediate chamber and at least one outlet chamber axially adjacent said intermediate chamber, said intermediate chamber opening outwardly and being closed by a shell of fine-porous material, an inner wall member of the double wall of said intermediate chamber having at least one fitting for supplying a protective gas thereto, said outlet chamber communicating with said zone and being formed along an inner wall member of the double wall of the cylinder with a throttle permitting throttled escape of gas therefrom; and
    respective support rings form-fittingly engaged in said end chambers and braced against inner surfaces of said pipes for sealing said zone against escape of gas.

2. The device defined in claim 1 wherein said end chambers have a slit outer wall member of the double wall of the cylinder and form-fittingly receive inner peripheries of said rings.

3. The device defined in claim 1 wherein said intermediate chamber is open outwardly over its entire axial width and said shell spans said axial width.

4. The device defined in claim 3 wherein said intermediate chamber is delimited axially within said double wall of said cylinder by a pair of radial partitions having inwardly opening grooves receiving said shell.

5. The device defined in claim 1 wherein said outlet chamber has an outer wall member of the double wall of said cylinder formed with at least one opening communicating with said zone.

6. The device defined in claim 5 wherein a respective outlet chamber is disposed between each of said end chambers and said intermediate chamber on said cylinder.

7. The device defined in claim 1 wherein said cylinder is composed of a plurality of cylinder ring segments with respective gas feed fittings and throttles.

* * * * *